Nov. 4, 1958 R. A. HAUTAU 2,858,719
INTERMITTENT MOTION MECHANISM
Filed Sept. 19, 1956 2 Sheets-Sheet 1

ROBERT A. HAUTAU, INVENTOR.

BY Allen M Kraus
AGENT

United States Patent Office 2,858,719
Patented Nov. 4, 1958

2,858,719
INTERMITTENT MOTION MECHANISM

Robert A. Hautau, Oak Park, Mich.

Application September 19, 1956, Serial No. 610,853

1 Claim. (Cl. 74—84)

This invention relates to mechanisms and more particularly to a mechanism for obtaining an intermittent motion from a continuous rotation.

In automatic machinery, it is often necessary to obtain an intermittently operative rotary motion. The source of power in such a machine is generally an electric motor or some similar constantly operative rotary source. It is, therefore, necessary in such machines to provide a mechanism for converting the constantly operative motion to an intermittently operative motion. Devices for accomplishing this purpose are well known to the art. The present invention contemplates a novel mechanism for converting constant rotary motion to intermittent rotary motion which is simple of construction so as to be economical of manufacture, easy to maintain, and dependable in operation.

In essence, the present invention comprises three gears which are coupled by links in such a manner as to have the centers of two of the gears each maintaining a constant distance from the center of the third gear. The center of one gear is caused to rotate through an orbit from the source of constant rotation. This gear, therefore, transfers motion to the second gear with which it is in mesh. The second gear, in turn, transfers its motion to the third gear. The dimensions of the gears and their couplings are such that an intermittent rotary motion is produced by the third gear. This mechanism in itself is not novel; however, I have added a mechanism for eliminating any tendency of the third gear to rotate in a direction opposite to its normal rotation.

If the mechanism is so designed as to produce long periods of dwell in the third gear, this backup motion is inherent. By providing a mechanism for eliminating the backup motion, I provide a mechanism which can dwell for longer periods of time than normal three gear index mechanisms.

It is, therefore, an object of the present invention to provide an indexing mechanism which is simple in construction.

It is a further object of the present invention to provide an indexing mechanism which uses the known three gear principle.

It is still a further object of the present invention to provide an indexing mechanism using the three gear principle which additionally provides mechanism for eliminating any backup motion of the third gear.

Figure 1:
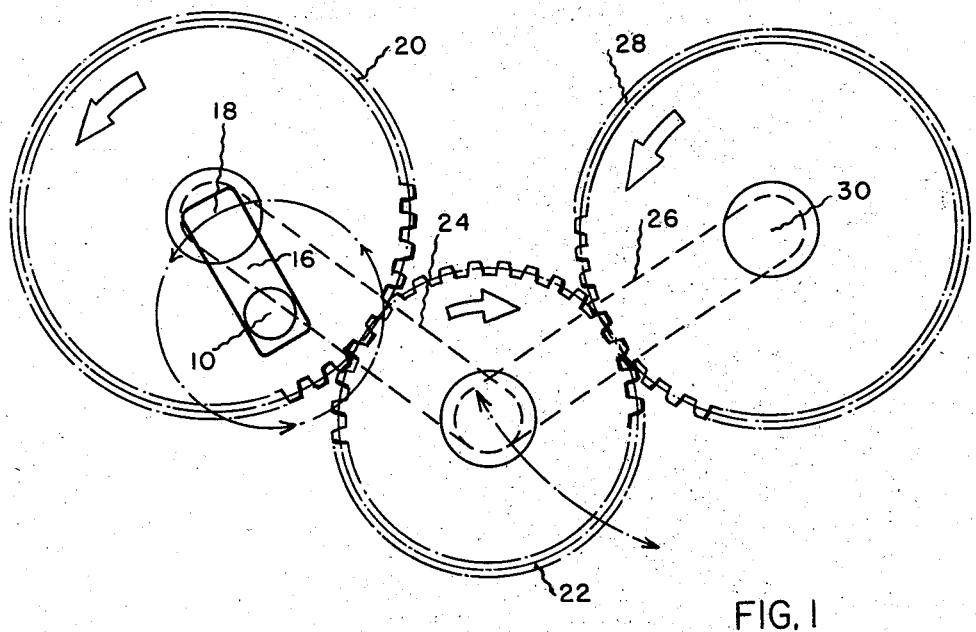
Figure 2:
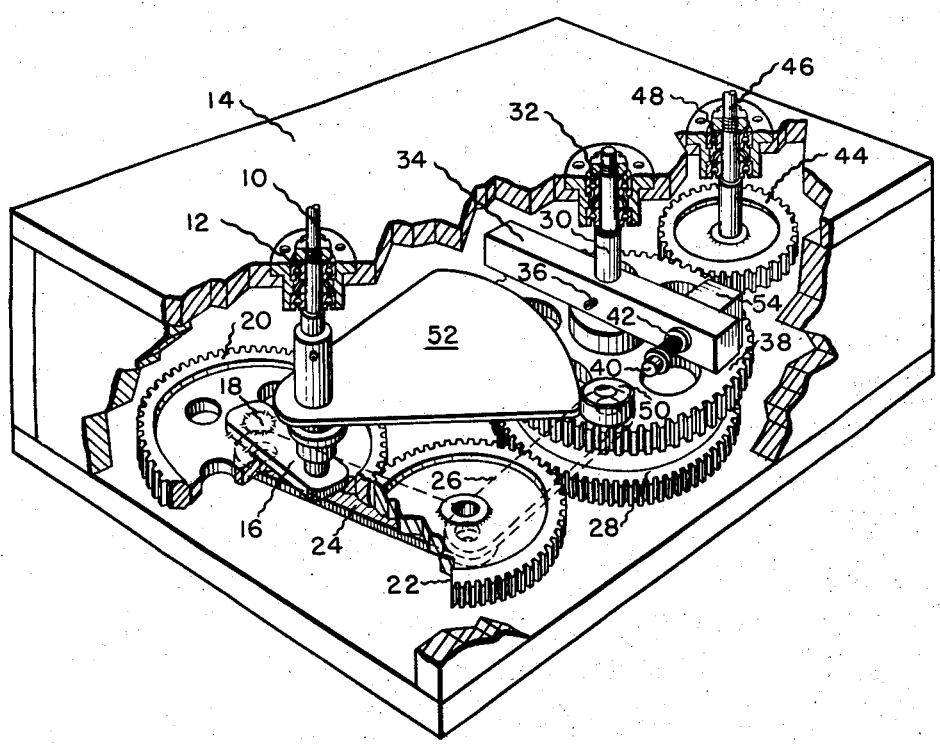

Other objects, advantages and applications of the present invention will be made apparent by the following detailed description of an embodiment of the invention. The description makes reference to the accompanying drawings in which:

Figure 1 represents a schematic view of the three gear mechanism illustrating the orbits assumed by various gears and Figure 2 is a perspective view, partially broken away, illustrating a mechanism embodying the present invention.

Referring to Figure 2, the constantly rotating input to the device is provided through a shaft 10, which is journaled in a bearing 12 that is supported in a box 14. At its lower end, the shaft 10 carries a crank 16 which has its outer end pinned to the center 18 of a standard circular gear 20. As the shaft 10 rotates, the gear center 18 rotates in a circular path about the shaft 10. A second gear 22 has its center connected to the center 18 of the gear 20 by a link 20 which is pinned to both of the centers. The gear 22 is, therefore, always in mesh with the gear 20.

A second link 26 also connects the center of the gear 22 to the center of the third gear 28 so that the gear 28 is also in constant mesh with the gear 22. The gear 28 drives the shaft 30 which is also journaled in a housing 14 through a bearing 32.

A bar 34 is pinned to the shaft 30 by a lockscrew 36 so as to cause the bar 34 to move with the shaft 30. At its outer end, the bar 34 is in contact with a block 54 which is fixed near the periphery of a fourth gear 38. The bar 34 is connected to the block 54 through a spring arrangement which comprises a rod 40 which is firmly affixed to the block 54 and passes through a hole in the bar 34. A spring 42 has one end fixed to the free end of the pin 40 so that the free end of the spring 42 presses against the bar 34 and normally retains it in a pressed relationship with the block 36, however, pressure exerted in opposite directions between the block 54 and the bar 34 will cause them to act against the spring 42 so as to separate. The gear 38 drives an output gear 44 which has its shaft 46 journaled in a bearing 48 in the housing 14.

Referring to Figure 1, the motion of the gears 22 and 28 under the influence of the rotation of the shaft 10 may be readily observed. The rotation of the shaft 10 causes the center 18 of the gear 20 to move through a circle which has as its radius the length of the coupling link 16. The gear 20 which is rigidly fixed to the shaft 18, therefore, attains a constant angular velocity which it communicates to the coupling gear 22. But the gear 22 has its center fixed only by the coupling pins 26 and 24 which keep it in mesh with the gears 28 and 20, the center of the gear 28.

Its absolute rotation is therefore equal to the difference in angular velocity between the motion of its center and the rotation of gear 20. By properly adjusting the length of the links 16 and the relative diameters of the gears 20, 22, 28, it is possible to arrive at various combinations of motion of the gear 22. Among them is a class in which, during part of its cycle, the motion of its center is equal to the rotation of the gear 20 and therefore, the gear 22 does not rotate. The rotation of the gear 28 is equal to the angular rotation of the gear 22 minus the velocity of the center point of gear 22. When these two are equal, the gear 28 does not move.

Index mechanisms are known to the art which rely upon this pause in rotation of the gear 28 which occurs with certain combination of gear rotations and crank lengths. However, in all these gear arrangements, there is always some backing up of the gear 28. That is, the gear moves to a small extent in a direction opposite to its normal direction of rotation. In order to provide for that problem, the present invention as illustrated in the embodiment of Figure 2 provides mechanism for allowing the gear 28 to back up without causing backup of the gear 44. This arrangement includes a rotary cam follower 50 which is rotatably positioned on the periphery of the gear 38. A cam 52 which is carried on the shaft 12 is so designed as to come into contact with the follower 50 during those positions of the gears in which the output shaft 46 should be stationary. Referring again to Figure 2, the normal intermittent rotation of the gear 38 is in the direction of the arrow. When the aspect of the gears is such that the gear 38 is idling, the cam 52 comes into contact with the roller 50. As the shaft 30 begins to rotate in a direction opposed to the arrow, the roller 50 presses against the cam 52. Therefore, the arm 34 moves against spring 42 so as to separate from the block 36. When the rotation of the gear 38 in a normal direction begins, the block 34 once again presses the block 36 and rotates the gear 38 and communicates that rotation to the output gear 44.

Therefore, the direction of the rotation of the output 44 is never in a direction opposed to its normal intermittent rotation. The output gear 44 may therefore be used on devices which require a high degree of positioning accuracy. It may also be used where a relatively long dwell is required, since as the dwell increases, the backup of the third gear in the three gear mechanism normally increases; however, that is compensated for by the mechanism of the present invention.

Having thus described my invention, I claim:

In a mechanism: a first gear; a second gear; a link rotatably connecting the centers of said first gear and said second gear so as to maintain said gears in mesh; a third gear journaled in a stationary plate so as to constrain its motion to rotation; a second link rotatably connecting the centers of said second gear and said third gear so as to maintain those gears in mesh; a source of rotative power for continuously rotating the center of said first gear in an orbit about a stationary axis, whereby said third gear is intermittently rotated in a first direction and between said periods of rotation is caused to move in a second direction; a plate coupled to said third gear in such manner as to directly receive the rotation of said third gear when said third gear moves in a first direction and to receive the rotation of the said third gear through a spring when said third gear rotates in a second, opposite direction; a cam follower on said plate; and a cam carried by said first gear in such a manner as to be in contact with said cam follower so as to restrain a motion of said plate at such times as said third gear is moving in said second direction.

References Cited in the file of this patent

UNITED STATES PATENTS

| | | |
|---|---|---|
| 1,393,219 | Hohl | Oct. 11, 1921 |
| 1,539,294 | Bronandes | May 26, 1925 |
| 1,975,126 | Scholin | Oct. 2, 1934 |